Jan. 22, 1924.　　　　　　　　　　　　　　　　　　　　1,481,702
G. R. FICKERT
BELT CALCULATOR
Filed May 26, 1922　　　　　2 Sheets-Sheet 1
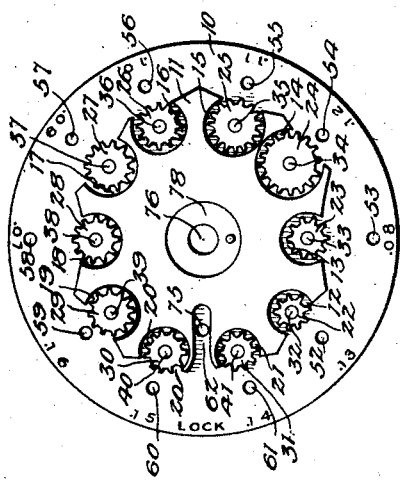
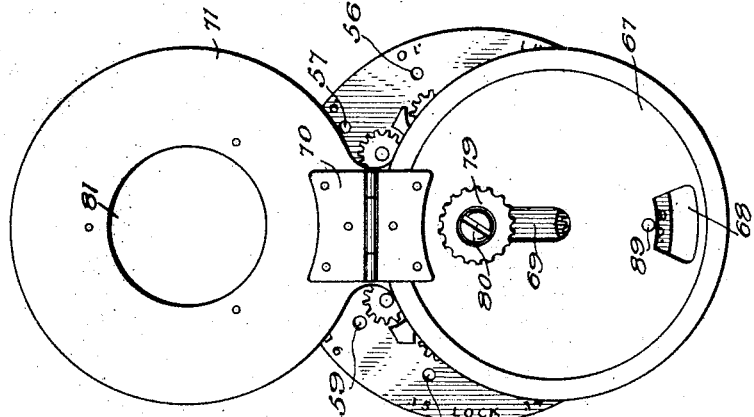
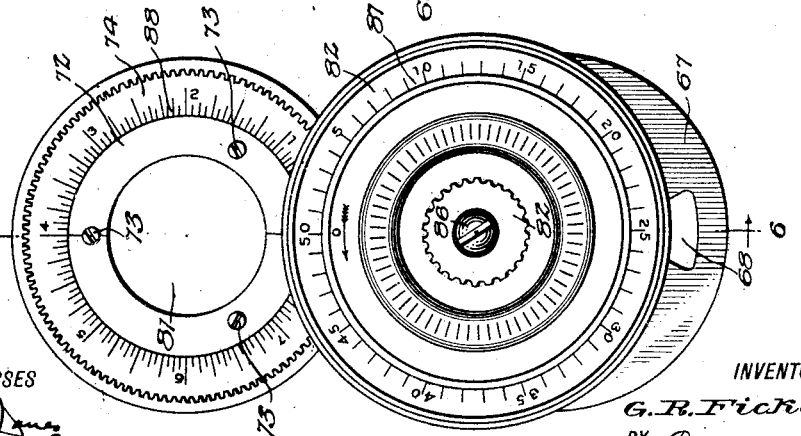
WITNESSES
INVENTOR
G. R. Fickert
BY
ATTORNEYS Jan. 22, 1924.

G. R. FICKERT

BELT CALCULATOR

Filed May 26, 1922

WITNESSES

INVENTOR
G. R. Fickert
BY
ATTORNEYS

Patented Jan. 22, 1924.

1,481,702

UNITED STATES PATENT OFFICE.

GUSTAV RICHARD FICKERT, OF HOBOKEN, NEW JERSEY.

BELT CALCULATOR.

Application filed May 26, 1922. Serial No. 563,849.

*To all whom it may concern:*

Be it known that I, GUSTAV R. FICKERT, a citizen of the United States, and a resident of Hoboken, in the county of Hudson and State of New Jersey, have invented new and useful Improvements in Belt Calculators, of which the following is a full, clear, and exact description.

This invention relates to belt calculators. The general object of this invention is the provision of a simple, accurate and efficient device for calculating the stretch of known lengths of belting having different factors of stretch.

This object is accomplished by providing movable scales that may be set in a predetermined relation to one another, and associating with the scales trains of gears that may be selectively interposed between the scales to rotate one through a certain angle depending on the train of gears selected when the other scale is rotated.

This and other objects of the invention will be more clearly understood from the following detailed description and accompanying drawings.

Figure 1 is a top plan view of the calculator;

Figure 2 is a bottom plan view of the calculator;

Figure 3 is a bottom plan view of the foundation plate carrying the gear wheels;

Figure 4:
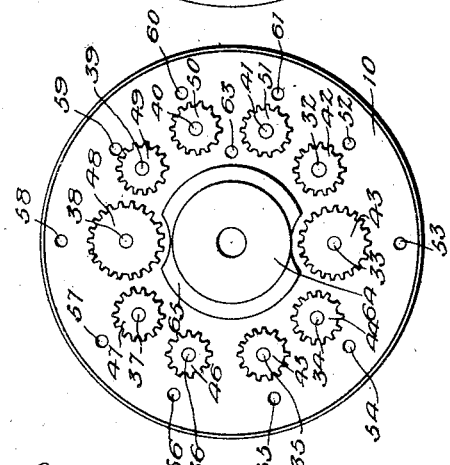
Figure 4 is a top plan view of the plate shown in Figure 3.

Referring to Figures 3 and 4 of the above-mentioned drawings, a foundation plate 10 is shown with a plate 11 mounted thereon. Circular pockets 12 to 21, inclusive, are cut in this plate to receive the gear wheels 22 to 31, inclusive. The thickness of the plate 11 is equal to the thickness of the gears 22 to 31, inclusive. These gears 22 to 31, inclusive, are fixed to shafts 32 to 41, inclusive, respectively. The shafts are rotatably mounted in the plate 10 and project through a distance sufficient for mounting gear wheels on the opposite ends from the gear wheels 22 to 31, inclusive. Gear wheels 42 to 51, inclusive, are fixed to the shafts 32 to 41, inclusive, respectively. A slot 62 extends into the plate 11 and in alinement with this slot an opening 75 extends through the plate 10. Opposite the gear wheels openings 52 to 61, inclusive, are provided which extend through the plate 10, as shown in Figures 3 and 4. An opening 76 extends through the center of the plate 10 and a hollow shaft 77 having a disk 78 attached thereto projects through this opening. Opposite the openings 52 to 61, inclusive, certain numbers ranging from .07 to .16 are stamped, as shown in Figure 3. These numbers are the factors of stretch for different types of belting.

Figure 7:
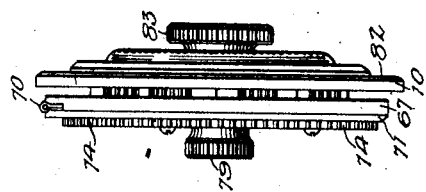
Figure 7 is a side elevation of the calculator in a folded position.
Figure 6:
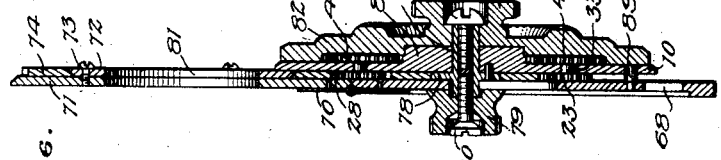
Figure 6 is a section along the line 6—6, Figure 1.
Figure 5:
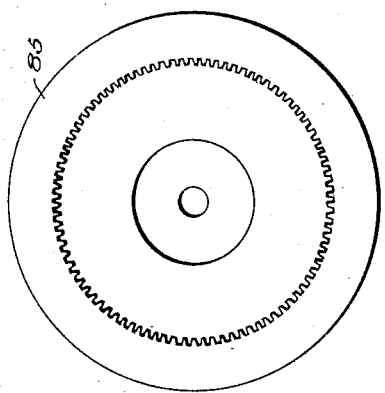
Figure 5 is a bottom plan view of the scale for indicating the length of belt.

Referring to Figure 2, a plate 67 of slightly smaller diameter than the plate 10, provided with an observation opening 68 and a slot 69, is loosely mounted on the lower end of the hollow shaft 77. A button 79 attached to the hollow shaft 77 by means of a screw 80 which makes threaded engagement with an internal thread provided in the hollow shaft serves to retain the plate 67 in position. Attached to the plate 67 by means of a hinge 70 is a plate 71 which is approximately the same diameter as the plate 67. An opening 81 extends through the centre of the plate 71. An annular ring 72 having its outer edge beveled is attached to the upper face of the plate 71 by means of screws 73. Rotatably mounted on the plate 71 and retained in position by the annular ring 72 is an annular ring 74 having its outer edge formed into teeth, as shown in Figure 1. Referring to Figure 6, a plate 82 of approximately the same diameter as the plate 10 is rotatably mounted on the hollow shaft 77 seating on a projection 84 extending upward from the plate 10. A knob 83 is provided in conjunction with the plate 82 for rotating the same. The lower face of the plate 82 is cut away, as shown in Figure 5, to form an annular ring 85 and on the inner edge of this annular ring teeth are cut. The internal diameter of this annular ring 85 is of such a size that it fits over the gears 42 to 51, inclusive, meshing with the same. Thus upon the operation of the annular ring 85 all of the gears 42 to 51, inclusive, are operated and through the shafts 32 to 41, the motion is conveyed to the gears 22 to 31, inclusive. The plate 82 is retained in position by a screw 86 which projects through the knob 83 and engages in an internal thread in the hollow shaft 77.

Referring to Figure 1, the plate 82 has a scale 87 for indicating length of belt marked thereon. In this particular case the disk is divided into fifty equal parts, as shown in the scale, and each part represents a foot of length of belt. The annular ring 74 has a scale 88 marked thereon. In preparing this scale, the ring is divided into eight equal parts which represent inches, and each of these equal parts are again subdivided into sixteen equal parts to represent sixteenths of an inch. A vertical line is marked on the annular ring 72. In arriving at the number of equal parts into which the annular ring 74 should be divided the maximum number of feet represented on the plate 82 is multiplied by the greatest factor marked on the plate 10 which is .16 inch. The product of these two numbers is 8. This represents the amount of stretch for fifty feet of belt having a factor of stretch of .16 inch per foot and, therefore, is the maximum stretch which will be measured by this calculator by operating the gear 50 through one complete revolution.

In determining the number of teeth to be provided on the annular ring 74, on the annular ring 85 and the various gears 22 to 31, inclusive, and 42 to 51, inclusive, the size of the calculator is of first importance. In order to provide a small and compact calculator, as shown in the drawings, the annular ring 74 is provided with ninety-six teeth and the annular ring 85 with eighty-four. In working out the ratio of the gears for any particular factor these two annular rings have to be considered. Consider the factor .16, as shown in Figure 3, which is the factor for the gears 24 to 44, located diametrically opposite. For one revolution of the plate 82 to which the annular ring 85 is attached the annular ring 74 will have to make one complete revolution in order to give the accurate belt stretch. In determining the number of teeth for the gear 44 a number such as 14 is selected arbitrarily. Then 84 is to 14 as 96 is to $x$. Working out this ratio $x$ will be found to equal 16. Therefore, the gear 44 is provided with fourteen teeth and the gear 24 with sixteen teeth. The remaining gears are worked out in a like manner, an effort being made to keep the greatest number of teeth provided on any gear below about 22. Taking another example, say the factor .10. The maximum stretch of fifty feet of belt for this factor is five inches. Then for one revolution of the plate 82 the annular ring 74 must be rotated through five-eighths of a revolution or through the distance occupied by sixty teeth. The ratio in this case would be 84 is to 14 as 60 is to $x$, 14 being the number of teeth selected for the gear wheel 51. When this ratio is worked out the number of teeth that should be provided on the gear wheel 31 is found to be 10. The remaining gears are worked out in the same manner.

In describing the operation of this device consider the example shown in Figures 1 and 2. In this case, the number 8 on the annular ring 74 is first set in the position in alinement with the vertical line on the ring 72 and in the position occupied by 4 in Figure 1. Plate 82 is set with the graduation mark 50 in alinement with the vertical mark on the ring 72, as shown in Figure 1. Next, the plate 67 is released by releasing the button 79, and this plate is adjusted until the projection 89 is fitted into the opening 53 in the plate 10, as shown in Figure 2. Button 79 is then tightened, retaining the plate 67 in the position to which it has been adjusted. The ring 71 is now rotated about the axis of the hinge member and the annular ring 74 associated with the gear 28. This gear and the gear 48 mounted on the same shaft 38 were designed to rotate the scale 88 in the proper ratio to the scale 50 for the factor .08. If the length of the belt is 50 feet and the plate 82 is rotated to the left through one revolution, as shown in Figure 1, this rotates the scale 88 through half a revolution, as shown in the same figure. Therefore, the stretch for 50 feet of belt having a factor of .08 inch per foot would be 4 inches. In preparing a belt of this type to operate pulleys, the over-all measurement of which is 50 feet, it would be necessary to cut away 4 inches of belt.

I would state in conclusion that while the illustrated example constitutes a practical embodiment of my invention, I do not limit myself strictly to the exact details herein illustrated, since manifestly the same can be considerably varied without departing from the spirit of the invention as defined in the appended claims.

Claims:

1. A belt calculator for determining belt stretch, comprising two movable graduated members adapted to be set in a predetermined relation to one another, one graduated to represent lengths of belt, the other indicating belt stretch for the different lengths of belt to give the proper tension, and trains of gears for the different factors of stretch associated with one of the movable members and adapted to be selectively associated with the other movable member to operate the belt stretch scale to indicate belt stretch when the belt scale is moved to indicate a length of belt.

2. A belt calculator for determining belt stretch, comprising a foundation plate, a disk radially graduated to represent length of belt rotatably mounted on the foundation plate, an annular plate graduated to represent stretch of belt for the different lengths as indicated by said belt scale rotatably mounted on a member attached to said foundation plate, trains of gears for the different factors of stretch of belt mounted on the foundation plate and operated by the operation of the disk graduated to indicate length of belt, and means for selectively associating the annular plate with any train of gears so that upon rotation of the belt scale disk through an angle indicating a length of belt the annular plate will be rotated through an angle indicating the stretch of belt.

3. A belt calculator for determining belt stretch, comprising a foundation plate, two circular scales rotatably mounted associated with the foundation plate, one graduated to represent length of belt, the other to represent belt stretch for the different lengths of belt, and means carried by the foundation plate adapted to be interposed between the scales to operate the belt stretch scale at the proper rate relative to the belt scale to indicate belt stretch for different factors when the belt scale is rotated through a certain angle indicating a length of belt.

4. A belt calculator for determining belt stretch, comprising a foundation plate, two circular scales rotatably mounted provided in conjunction with said foundation plate, said scales adapted to be set in a predetermined relation to one another, a train of gears for each of the different factors of stretch for belting carried by the foundation plate and associated with the belt scale, and means for associating the belt stretch scale with any train of gears so that upon the rotation of the belt scale through an angle indicating a length of belt the belt stretch scale is operated to indicate the belt stretch for the factor for which the train of gears interposed between the scales has been designed.

GUSTAV RICHARD FICKERT.